April 7, 1964 R. LOEWY 3,128,125
PNEUMATIC CAR SEAT
Filed Nov. 14, 1960 2 Sheets-Sheet 1
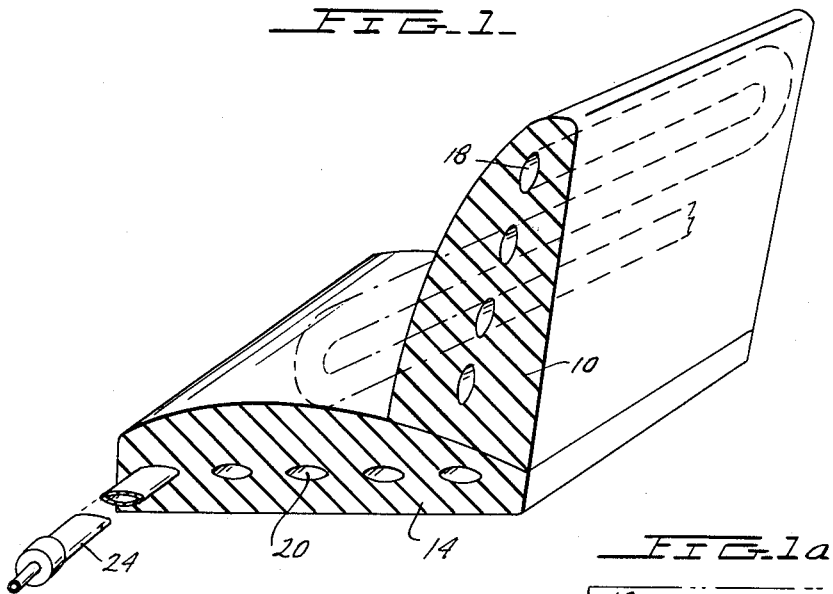
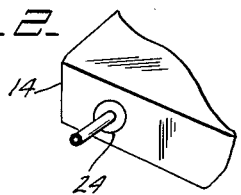
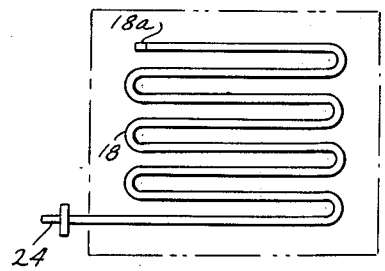
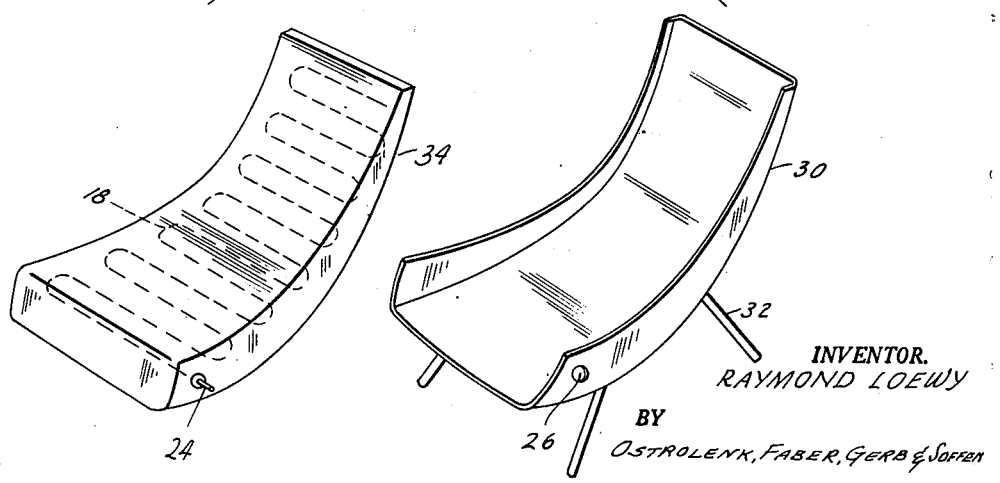
INVENTOR.
RAYMOND LOEWY
BY
OSTROLENK, FABER, GERB & SOFFEN
ATTORNEYS April 7, 1964 R. LOEWY 3,128,125
PNEUMATIC CAR SEAT
Filed Nov. 14, 1960 2 Sheets-Sheet 2
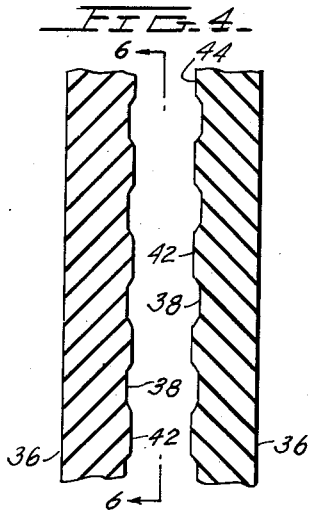
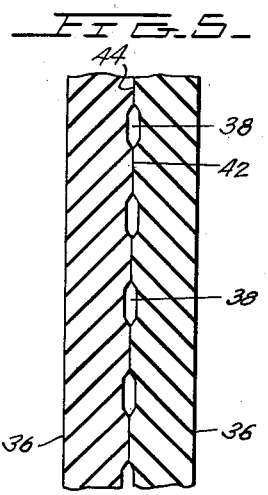
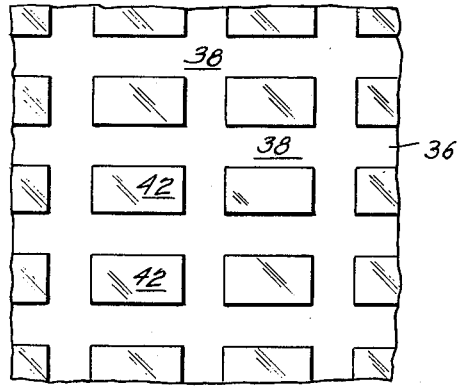
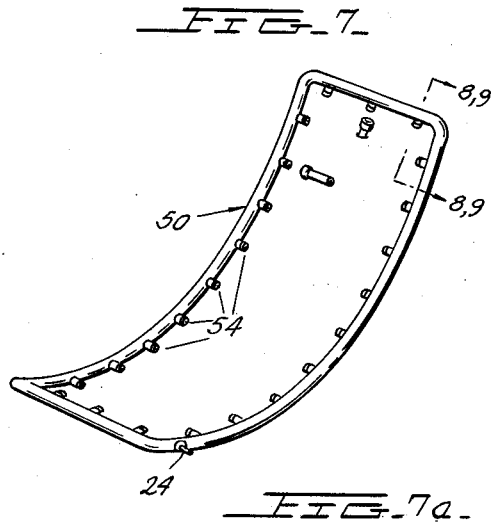
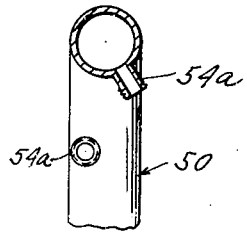
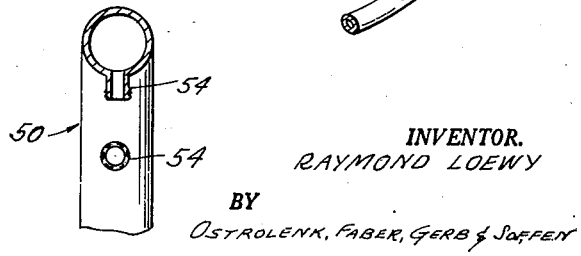
INVENTOR.
RAYMOND LOEWY
BY
OSTROLENK, FABER, GERB & SOFFEN
ATTORNEYS

United States Patent Office 3,128,125
Patented Apr. 7, 1964

3,128,125
PNEUMATIC CAR SEAT
Raymond Loewy, 900 5th Ave., New York, N.Y.
Filed Nov. 14, 1960, Ser. No. 68,713
1 Claim. (Cl. 297—452)

This invention relates to pneumatically cushioned seats, especially seats for use in vehicles, but not necessarily limited thereto.

It is an object of the invention to provide a pneumatic seat, especially for automobiles, of simple and rugged construction and one which may be readily inflated at any gas station in the same way in which the car tires are inflated and by the same equipment.

It is another object of the invention to provide pneumatically braced or supported automobile seat and back cushions wherein the degree of inflation for effecting any desired rigidity is readily effected for the seat cushion and back cushion, independently of each other.

Briefly, my invention comprises a seat or back cushion construction which utilizes the regular upholstered seat materials, for example, foam plastic or rubber slabs or blocks, combined with inflatable air tubes or passages spacedly molded within such block or blocks. Thus, in one form of the invention the foam rubber may be provided with passages therethrough at the time of molding of the block, the passages all communicating with each other, a tire valve accessible from the exterior of the block or of the finished seat connecting with the passage formation for inflation of the entire tubular array.

Another form of the invention may take the form of a pair of slabs of foam rubber or the like molded or cut with channels, which slabs are then cemented to each other so that the channels are superimposed to form interconnecting inflatable passages.

Still another form of the invention may comprise a generally rectangular pipe frame having a curvature along the long sides in the general shape of a contour chair. A plurality of inflatable pipes or tubes may be connected across the pipe frame to create a seat of inflatable interlaced cords.

A detailed description of the invention will now be given in conjunction with the appended drawing in which:

FIGURE 1 is a perspective cross-sectional view showing the arrangement of a zigzag series of channels, parallel to each other in the back rest and seat cushion of a car seat;

FIGURE 1a is a layout of the channel arrangement for both the seat cushions and the back rest;

FIGURE 2 is a detail of a corner of the seat showing the air valve;

FIGURE 3 is a perspective of a contour type of bucket seat of general utility with the inflatable seat cushion therefor;

FIGURE 4 is a cross-sectional elevation of a pair of foam rubber slabs having channels therein prior to cementing said slabs together to form a labyrinth pattern of channels for holding air;

FIGURE 5 shows the slabs cemented together, in cross-section;

FIGURE 6 is a view looking in the direction 6—6 of FIGURE 4;

FIGURE 7 is a perspective of a rectangular pipe frame fashioned to form the skeleton of a bucket type seat or contour chair and an air manifold;

FIGURE 7a shows a position of the skeleton frame to illustrate one mode of porting; and FIGURES 8 and 9 are sections through 8—8 and 9—9 of FIGURE 7.

Referring to FIGURE 1, the invention comprises a molded foam rubber back cushion 10 and seat cushion 14. Each piece is molded with a parallel end-connected air passage such as 18 in the back cushion and 20 in the seat cushion. It will be understood, considering the back rest 10, that one end of the passageway may be blocked at 18a and the other end provided with a standard tire valve 24 for inflation, as shown in FIGURES 1, 1a and 2. As will be noted in FIGURE 1, the passageway and valve arrangement is substantially the same for the seat cushion 14. Thus, either or both units may be inflated readily by means of the air hose at a gas station to any desired pressure, regulated by the air hose meter. Accordingly, drivers may select at their option a degree of hardness personally preferred for the back rest or the seat cushion to ensure maximum comfort. This is particularly advantageous in the case of persons having infirmities or ailing backs where a differential of hardness as between the back cushion and the seat cushion may be desired. For long hard driving, many people prefer a relatively hard back rest, even though they suffer from no back ailment. A hard back rest is considered to give better support for fatigue prevention.

It will of course, be understood that the back cushion and seat cushion may be integrally molded, each with a respective continuous zigzag array of passages and a separate valve for each cushion, or, alternatively, a single valve may serve the entire passageway system if the passages form a continuous system, thereby of course sacrificing the selective differential hardness effect.

One form of a single unitary passage system is contemplated for a bucket-type of seat which is used in some cars. Thus, in FIGURE 3, a pressed metal or molded plastic frame bucket 30 is provided with supports 32; a contour molded foam rubber combination back and seat element 34 may be placed in the frame 30. It will be understood that the element 34 has air holding channels, such as 18 or 20, continuously molded in the interior thereof terminating in the exterior valve 24 for inflation.

Channels such as 18 or 20 may be molded in diverse ways, known in the art, and cushions constructed in single or two piece construction by methods heretofore known. Air valve 24 may be accessible through opening 26.

Referring now to FIGURES 4 and 6, there are shown fragmentary pieces of molded foam rubber slabs 36 having molded recesses 38 in both directions and raised plateaus 42 surrounded by the recesses, as clearly shown on FIGURE 6. Thus, if the pieces 36 are brought contiguous with each other so that the plateaus 42 are in engagement and cemented together, an internal air holding labyrinth passageway formation of high capacity is realized. Of course, a suitable margin around the edge of the two slabs would likewise be cemented in order to form a completely closed article, as indicated by the margins 44 on FIGURES 4 and 5. The teaching of FIGURES 4, 5 and 6 could be used either as a back or seat cushion or as the envelope for a skeleton frame 50 (FIGURE 7) comprised of a continuous air manifold tube of steel or aluminum having the air valve 24; thus the frame would be of rectangular shape and curved on the long side, as shown to conform to a bucket seat or contour chair of the general configuration shown in FIGURE 3. In such instance, the slabs 36 would be applied to each other with the tubing disposed in such channels 38 as register therewith so as to be completely sandwiched between the slabs, the frame being ported all around to conduct air to all channels 38 simultaneously FIGURE 7a shows a portion of the frame thus provided with ports 52. Alternatively, the marginal areas 44 of FIGURES 4 and 5 could be made wide enough to encompass the frame and be cemented therearound with short stub tubes or piping 54 extending from ports around the frame sides, as shown in FIGURE 7. Thus, the stub pipes would protrude into the channels 38 all around the frame so as to provide a full passage for inflating air thereto. It will, of course, be understood that the valve 24 would be suitably extended as to its passageway so as to protrude exteriorly of the foam rubber slabs for access.

A preferred use of frame 50 of FIGURE 7 is to connect inflatable tubes between opposite stub tubes 54, the tube stubs 54a for the horizontal tubes (FIGURE 8) being off-set from the tube stubs 54 (FIGURE 9) for the vertical tubes. In this way the tubes may be interlaced or lie in parallel planes as desired and an interlaced cord seat, where the interlacing cords are inflatable tubes may be used. Thus the tension on the tubes and the rigidity thereof may be controlled by inflation or deflation.

Having thus described my invention, I am aware that changes may be made without departing from the spirit thereof, and, therefore, do not seek to be limited to the precise illustrations herein given except as set forth in the appended claim.

I claim:

A pneumatic car seat comprising a seat cushion and a back cushion, each of said cushions being molded of resilient material and having a continuous respective zigzag air channel molded in the interior thereof, the air channels of said seat seat cushion being independent of the air channels of said back cushion, and a respective valve for the air channels of said cushions whereby said cushions may be inflated to selective degrees of hardness.

References Cited in the file of this patent
UNITED STATES PATENTS

| | | |
|---|---|---|
| 2,674,752 | Berman | Apr. 13, 1954 |
| 2,711,786 | Weiss | June 28, 1955 |
| 2,719,986 | Rand | Oct. 11, 1955 |
| 2,748,399 | Rockoff | June 5, 1956 |
| 2,764,228 | Donohue | Sept. 25, 1956 |
| 2,804,911 | Howarth | Sept. 3, 1957 |
| 2,822,554 | Wenzelberger | Feb. 11, 1958 |
| 2,826,244 | Hurley | Mar. 11, 1958 |
| 2,838,100 | Follows | June 10, 1958 |
| 2,901,028 | Bottemiller | Aug. 25, 1959 |
| 2,987,737 | Nail | June 13, 1961 |